Figure 1:
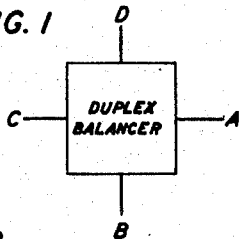

July 27, 1948.  W. A. TYRRELL  2,445,896
DIELECTRIC WAVE GUIDE COUPLING ARRANGEMENT
FOR USE IN TWO-WAY SIGNALING SYSTEMS
Original Filed Dec. 31, 1942  3 Sheets-Sheet 1

INVENTOR
W. A. TYRRELL
BY
Earl C. Laughlin
ATTORNEY

INVENTOR
W. A. TYRRELL
BY
Earl C. Laughlin
ATTORNEY

July 27, 1948.  W. A. TYRRELL  2,445,896
DIELECTRIC WAVE GUIDE COUPLING ARRANGEMENT
FOR USE IN TWO-WAY SIGNALING SYSTEMS
Original Filed Dec. 31, 1942  3 Sheets-Sheet 3

INVENTOR
W. A. TYRRELL
BY
Earl C. Laughlin
ATTORNEY

Patented July 27, 1948

2,445,896

UNITED STATES PATENT OFFICE 2,445,896

DIELECTRIC WAVE GUIDE COUPLING ARRANGEMENT FOR USE IN TWO-WAY SIGNALING SYSTEMS

Warren A. Tyrrell, Fairhaven, N. J., assignor to Bell Telephone Laboratories, Incorporated, New York, N. Y., a corporation of New York Original application December 31, 1942, Serial No. 470,810. Divided and this application March 6, 1945, Serial No. 581,285

12 Claims. (Cl. 178—44)

This is a division of my copending patent application Serial No. 470,810, filed December 31, 1942.

The invention relates to wave transmission systems and particularly to coupling arrangements for use in such systems.

The parent patent application discloses various forms of a coupling device utilizing the principle of wave balance to provide a desired distribution of wave power between a plurality of transmission lines or other transmission media in a wave transmission system. In general, this coupling device consists of a section of transmission line which may comprise dielectric wave guide, coaxial cable, parallel wire or other type of line, or an equivalent circuit with lumped circuit constants, forming a closed transmission loop of suitable dimensions. Four individual lines or circuits between which wave transmission at a given frequency is to be respectively prevented or allowed, are connected as branches to the transmission loop at given points. The types of electrical connections of the several branches to the loop are so selected, and the electrical spacing of the branches around the loop, or the equivalent line wavelength values of the loop portions between the branches, and the characteristic impedances of the branches with respect to that of the loop are proportioned so as to provide electrical balance with impedance matching at given frequencies between certain of the four branches and a desired amount of electrical unbalance between the other branches. Thus, wave transmission at the given frequencies between the first branches is substantially prevented and efficient wave transmission at these frequencies between the latter branches is obtained.

In one basic embodiment of the invention disclosed in the parent application, electrical balance independent of frequency between each two transmission branches connected to oppositely situated portions of the closed transmission loop and electrical unbalance between each two adjacently connected transmission branches around the loop are attained mainly by the use of dissimilar electrical connections (one series and one parallel) with the loop for two oppositely situated branches, and similar electrical connections (both series or both parallel) for the other two oppositely situated branches. In another disclosed basic embodiment, electrical balance at given frequencies between each two transmission branches connected to oppositely situated portions of the closed transmission loop and electrical unbalance at these frequencies between each transmission branch and each adjacently connected transmission branch around the loop are attained by providing between each two oppositely situated (non-adjacent) transmission branches, two electrical paths around the loop differing in effective electrical length by a half wavelength.

The parent application also discloses a number of modifications of the two basic types of coupling device including some employing superposed series and parallel connections of the transmission branches to the transmission loop at a common point, and various arrangements for combining wave guides or wave guides and coaxial lines to provide such superposed connections. This divisional application is directed specifically to the arrangements disclosed in the parent application for providing such superposed connections, and their application to duplex balancers.

The various objects and features of the invention will be understood from the following detailed description when read in conjunction with the accompanying drawings in which:

Fig. 1 is a simple diagram used in connection with a general description of the invention;

Figs. 2 to 11, inclusive, show sectional, cross-sectional or perspective views of different arrangements for combining wave guides or wave guides and coaxial lines to provide series and parallel connections such as are used in the duplex balancers of the invention; and Figs. 12 to 19 show diagrammatically different forms of duplex balancers including such superposed connections embodying the invention.

The term "duplex balancer" has been applied to the devices of the invention because they all operate by providing wave balance and are of primary utility for use in duplex communicating systems in which they render possible simultaneous two-way communication at the same frequency, but it is to be understood that the term as used in the description and in some of the claims should be given a broad interpretation not limited to duplex systems.

The device of the invention will be described in general terms with reference to the simple diagram of Fig. 1. In that figure, the device is represented as a box the nature of the contents of which is irrelevant to a general description, but it is to be understood that the contents are such as to bring about the results outlined below. Emerging from the box are four "leads" identified as A, B, C and D. A lead may be composed of wave guide, coaxial cable, shielded pair, a pair of wires or whatever is appropriate to the frequency involved. If a wave generator is connected to lead A, and if balance has been obtained and suitable loads are attached to the other three leads, the power from the generator will be evenly divided between the loads at B and D and no power will be developed in the load at C. Also, if the generator is connected to D, the power will divide equally between suitable loads at A and C, and no power will flow to a load at B. In one application of such a device, a signal transmitter may be connected to lead A, a dummy load to the lead D, a signal receiver to the lead C and a communication line to the lead B. The receiver will be unaffected by power flowing from the transmitter to the line and to the dummy load but the receiver will be responsive to power arriving over the communication line.

In certain constructions of the invention to be described hollow metal wave guides are employed for the closed transmission loop or ring forming the duplex balancer of Fig. 1 and for at least some of the transmission branches connected thereto corresponding to the leads A, B, C and D of that figure. From an infinite number of possible wave types which may be propagated in hollow metal wave guides, the dominant wave will be selected for sole consideration. The dominant wave is the wave of lowest critical frequency, and the most effective general argument in favor of its use, is that, by using a frequency intermediate between the critical frequencies of the dominant wave and of the next higher order wave, only the dominant wave can be propagated, and hence a confusing mixture of wave types, generated by discontinuities and imperfections in the wave guide constructions, is avoided. For this reason, it is likely that the restriction to the dominant wave will result in the simplest and most efficient form of wave guide duplex balancer. However, there seems to be no fundamental reason why other types of waves may not be used.

Wave guides of either circular or rectangular cross section are available. The rectangular wave guide presents superiority for many purposes due to the fact that if one dimension of the cross section is sufficiently small, the dominant waves can be propagated with only one polarization, i. e., with the lines of electric intensity parallel to the short side. In the constructions of the invention, therefore, the use of rectangular wave guides is favored.

Figure 2:
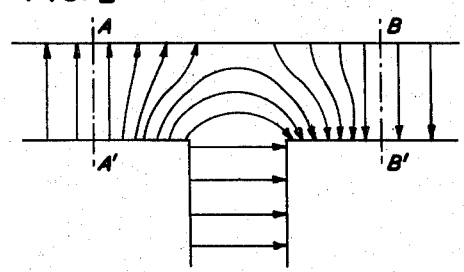

A knowledge of some of the fundamentals concerning wave guide branching is imperative for a proper understanding of the operation of wave guide duplex balancers. The most general case of such branching is quite complicated, but there are certain special cases referred to below which may be analyzed in a qualitative manner. Consider, for example, Fig. 2 which depicts a straight piece of rectangular wave guide, to which, at right angles, another rectangular guide has been joined in the electric plane, i. e., in the plane parallel to the lines of electric intensity of both guides. In Fig. 2 the lines of electric intensity are shown drawn according to Huygens' principle to indicate qualitatively the behavior when dominant waves are sent toward the junction of the two guides from the perpendicular arm. Although there may be some reflection at the junction, it will be seen that the "transmitted power" is equally divided between the two collinear arms, and that, if the cross sections AA' and BB' are equidistant from the junction, the waves at AA' are 180 degrees out of phase with the waves at BB'.

Figure 3:
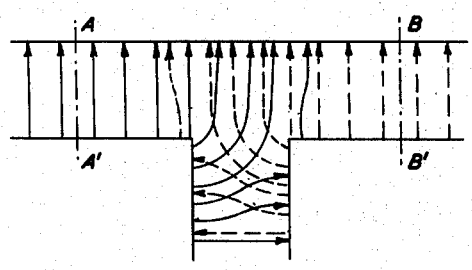

Fig. 3 shows the same branching scheme as Fig. 2, in which the solid lines within the guides represent the electrical intensities of waves arriving from the left and the broken lines the electrical intensities for waves arriving from the right, in the two collinear sections. It is seen that, if the two sets of waves are in phase at AA' and BB', the perpendicular arm receives waves which are 180 degrees out of phase. If, then, the magnitudes of the two original wave trains are equal, the waves in the side arm branch cancel identically, and that branch receives no power. Such trains of waves of equal amplitude traveling in opposite directions create, of course, standing waves with a voltage loop at the junction. In other words, a perpendicular side arm "plugged-in" in the electric plane at a voltage maximum of a standing wave will receive no power.

Figure 4:
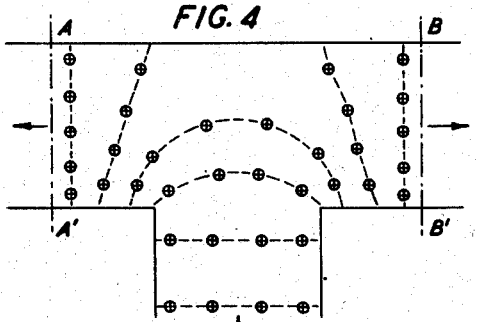

Fig. 4 shows a junction of wave guides in the magnetic plane, i. e., in the plane parallel to the lines of magnetic intensity, and, therefore, perpendicular to the lines of electric intensity, the latter being indicated by small circles. Lines of electric intensity are indicated for waves proceeding towards the junction from the side arm branch. Since here the geometry does not act to reverse the polarity of the lines of force, the waves crossing AA' are in phase with those crossing BB' and, moreover, for waves of equal amplitude proceeding from the left and from the right, in phase as they cross AA' and BB', respectively, the side arm branch will receive waves which are all in phase and will thus receive maximum power. In other words, the side arm receives maximum power when plugged in at what otherwise would be a voltage maximum of a standing wave.

Figure 5:
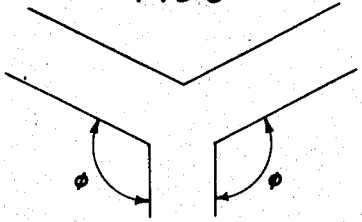

In order for the foregoing statements regarding branching in electric and magnetic planes to be true, it is not necessary that the two wave guide arms be collinear. It is, however, necessary that the branching be symmetrical with respect to the side arms. Fig. 5 indicates such symmetrical branching where the wave guide arms are not collinear.

From analogy with conventional transmission line connections, the arrangement of Fig. 2 may be identified as a series connection of the side arm to the "main guide" and that of Fig. 4 as a parallel connection, on account of the phase relationships which prevail. In the following description, the arrangement of Fig. 2 and that of Fig. 4 with the generalization permitted in Fig. 5, will be called a series connection and a parallel connection, respectively.

Figure 6:
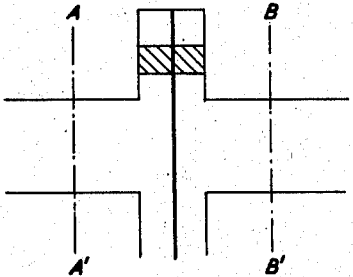

Fig. 6 shows an appropriate construction for effecting branching with a combination of wave guides and coaxial cable. Power delivered from the coaxial line, shown diagrammatically at the center of the figure, proceeds to the right and to the left with an 0-degree difference in phase between the waves crossing AA' and BB'. Conversely, for waves of equal amplitude traveling to the right and left in the wave guide, the coaxial cable will receive maximum power if the waves traveling to the right across AA' are in phase with those moving in the opposite direction, crossing BB'. A comparison of this behavior with that found in the arrangement of Fig. 4 shows that the arrangement of Fig. 6 may also, at least from phase considerations, be termed a parallel connection of a coaxial line to a wave guide. There are several other ways of establishing connection of a coaxial cable to a wave guide. For example, the inner coaxial conductor need extend only part of the way across the guide, or it may terminate, within the guide, in a suitable antenna the other end of which is connected back to the outer coaxial conductor. The connection might even be made in the magnetic plane, provided that the inner coaxial conductor terminates in some arrangement capable of receiving the wave guide power. It should be emphasized, therefore, that although the configuration shown in Fig. 6 is most often used for schematic illustration in this application, there are other methods of establishing connection between coaxial cable and wave guide which may be more suitable in specific applications.

The significant facts about the above-referred to special branching cases may be summarized as follows:

1. A generator in a perpendicular or symmetrical side arm of a wave guide sends waves into the two other arms which are 180 degrees out of phase if the side arm is connected in series with the other two arms. Such a series connection involves branching in the electric plane, as shown in Fig. 2 (or as generalized in Fig. 5);

2. A generator in a perpendicular or symmetrical side arm of a wave guide sends waves into the two other arms which are in phase if the side arm is connected in parallel with the other two arms. Such a parallel connection involves branching in the magnetic plane, as shown in Fig. 4 (or as generalized in Fig. 5), or involves a connection with a coaxial line, as shown in Fig. 6;

3. A symmetrical series connection to a wave guide containing a standing wave will receive no power if it is connected at a voltage maximum and will receive maximum power if it is connected at what otherwise would be a voltage node;

4. A symmetrical parallel connection to a wave guide containing a standing wave will receive no power if it is connected at a voltage node and will receive maximum power if it is connected at what otherwise would be a voltage maximum.

Figure 7:
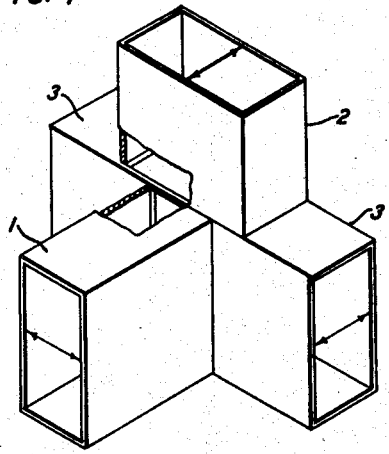
Figure 8:
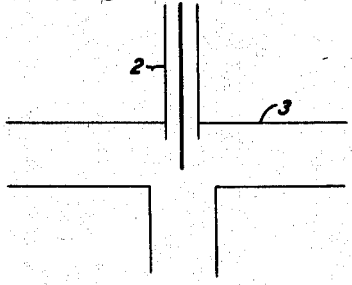

As will be pointed out later, in some forms of duplex balancers in accordance with the invention it is necessary to establish two, three or four branching connections to a wave guide at the same point. In regard to the superposition of two connections, only the case of one series and one parallel branching connection is of interest for duplex balancers. Fig. 7 shows one such case in which two branch rectangular wave guides 1 and 2 are joined to a main rectangular wave guide 3 at a common point. Branch wave guide 1 is connected to the main wave guide 3 in the electric plane, i. e., in the plane parallel to the lines of electric intensity of both guides, which, as explained previously in connection with Fig. 2, may be considered as a series electrical connection with the main guide; and branch guide 2 is joined to the main guide 3 in the magnetic plane, i. e., in the plane parallel to the lines of magnetic intensity, which, as explained previously in connection with Fig. 4, may be considered a parallel or shunt electrical connection with the main guide. Fig. 8 shows diagrammatically another way to establish the superposed connection in which coaxial cable is employed for the branch 2 to provide a parallel or shunt electrical connection to the main guide 3. On account of the presence of the wave guide series branch 1, it is not possible to use the exact arrangement of Fig. 6, so one of the alternative schemes already mentioned is employed. The particular scheme indicated in Fig. 8 provides for tuning by the variable extension of the inner coaxial conductor 4 across the wave guide 3.

The various general configurations of principal interest for cases of three and of four superposed connections to a main guide are summarized in the following table:

*Method of establishing connections*

|  | Series | Series | Parallel | Parallel |
|---|---|---|---|---|
| Three Connections: |  |  |  |  |
| a | Wave Guide | Wave Guide | Wave Guide |  |
| b | do |  | do | Wave Guide. |
| c | do | Wave Guide | Coaxial |  |
| d | do |  | Wave Guide | Coaxial. |
| e | do |  | Coaxial | Do. |
| Four Connections: |  |  |  |  |
| f | Wave Guide | Wave Guide | Wave Guide | Wave Guide. |
| g | do | do | do | Coaxial. |
| h | do | do | Coaxial | Do. |

Figure 9:
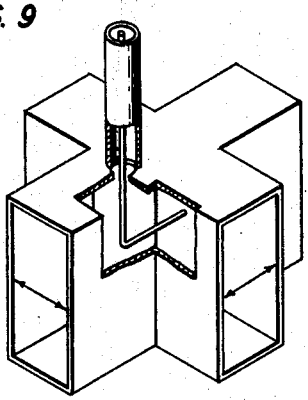
Figure 10:
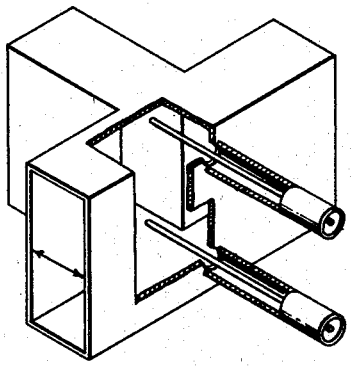
Figure 11:
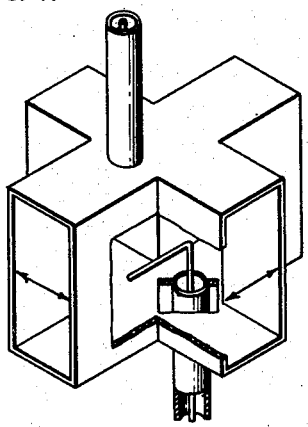

The arrangements for a, b and f are readily visualized by reference to Fig. 7, and for d by reference to Fig. 8. Possible arrangements for c, e and h are shown in Figs. 9, 10 and 11, respectively. The arrangement g is derivable from Fig. 9.

Some applications of superposed series and parallel electrical connections of branch wave guides or wave guides and coaxial lines to a main wave guide in duplex balancers in accordance with the invention are illustrated in Figs. 12 to 19 of this divisional application. The illustrated arrangements are condensed circuits derived from the basic duplex balancer circuits of Figs. 16, 17, 18 and 19 of the parent application. The condensed circuits shown in Figs. 12, 13 and 14 of this divisional application are derived from the circuits of Figs. 16, 17 and 19, respectively of the parent application by applying the rule that a half wavelength may be subtracted from each of any two arcs (loop portions between adjacent branches); and the circuits of 15 to 19 of the present application are all derived from the duplex balancer circuits shown in Fig. 18 of the parent application by removing in various ways one pair of half wavelengths from the transmission loop of the latter figure, the last, Fig. 19 of the present application, by subtracting two pairs of half wavelengths from the transmission loop of Fig. 18 of the parent application. The superposed branching connections employed in Figs. 12 to 19 of this application, illustrated diagrammatically, make use of one or more of the branching schemes of Figs. 6 to 11.

Figure 12:
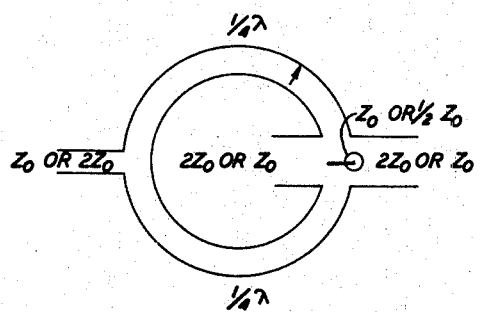
Figure 13:
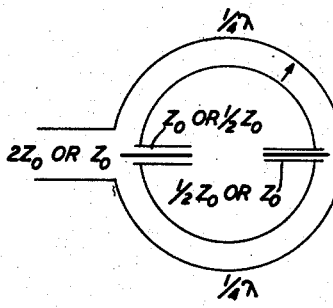
Figure 14:
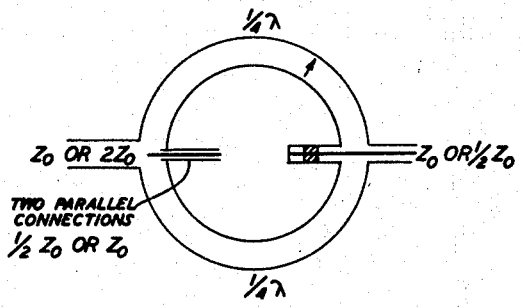
Figure 15:
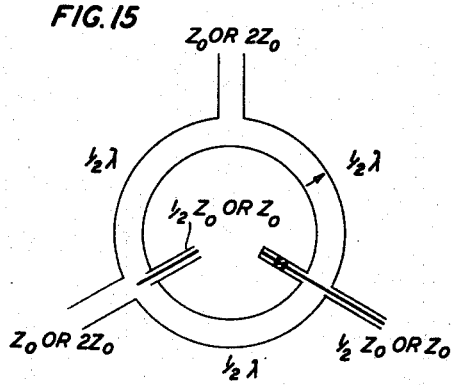
Figure 16:
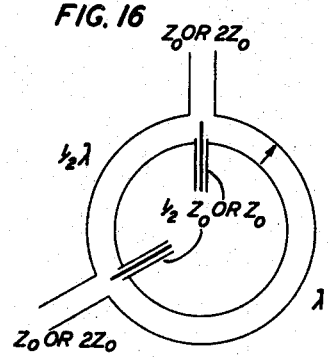
Figure 17:
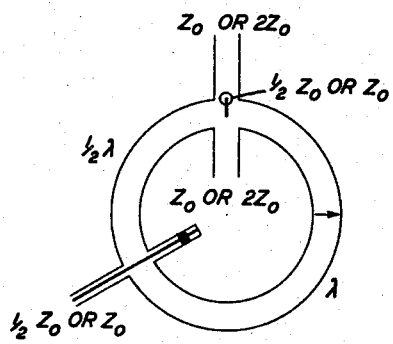
Figure 18:
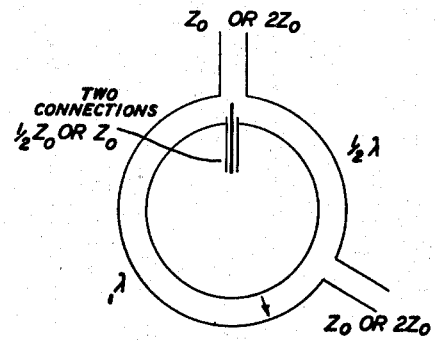
Figure 19:
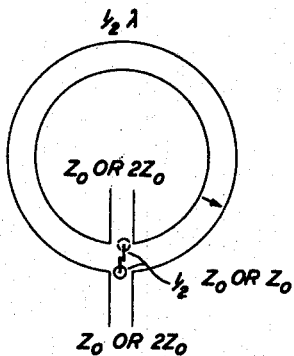

In each of the arrangements illustrated in Figs. 12 to 19, the intermediate transmission loop comprises a ring of rectangular wave guide; the transmission branches having a series electrical connection to the loop comprise straight pieces of rectangular wave guide; and the transmission branches having a parallel electrical connection with the loop comprise sections of coaxial line but may, of course, comprise instead straight pieces of wave guide connected to the wave guide loop in the magnetic plane, as illustrated in Fig. 7. The proper wavelength spacings between the transmission branches around the loop and the proper characteristic impedance of each of the four transmission branches with respect to the characteristic impedance $Z_0$ of the transmission loop in order to provide equal distribution of the wave power sent into the loop from a generator connected to one of the transmission branches, between two loads connected to two other adjacent transmission branches, are indicated on each of the Figs. 12 to 19. As in the case of the corresponding basic duplex balancers illustrated in Figs. 16, 17 and 19 of the parent application as described in the specification of that application, the condensed duplex balancers illustrated in Figs. 12, 13 and 14 of this divisional patent application achieve balance at any branching point by the dissimilarity (one parallel and one series) of the electrical connections of oppositely situated transmission branches. In the arrangements of Figs. 12 and 14, the degree of balance of the oppositely situated branch lines having dissimilar (one series and one parallel) electrical connections, is independent of frequency and depends only upon the extent to which the loads connected to these branch lines can be made identical, and the balance between the other two branch lines with similar electrical connections is frequency dependent. In the modified arrangement of Fig. 13 in which both pairs of oppositely situated branch lines have dissimilar types of electrical connections, the balance is also frequency dependent. The duplex balancers shown in Figs. 15 to 19 of this application, as in the basic duplex balancer shown in Fig. 18 of the parent application, achieve balance at the design frequency between either two oppositely situated transmission branches by the provision between the oppositely situated branching connections of two paths around the ring or loop which differ geometrically by a half wavelength, and the unbalance will increase as the difference between the operating frequency and the design frequency is increased.

Alternative methods for obtaining the desired superposed connections may, of course, be employed to provide other particular arrangements which, for certain applications, may be superior to those chosen for illustration. Some of the superposed connections to a wave guide may yield in practice considerable deviations from simple superposed connections. It is possible, then, that some of the conventional forms of duplex balancers to be made workable will require extensive reactance tuning (not shown). By reactance tuning is meant either the introduction into one or more arms of the balancer, of suitable devices which present adjustable reactances in shunt with the resistive loads, or the deliberate detuning of the load itself so as to present a reactive component in the load impedance. It is of the greatest importance that reactance tuning has been experimentally found to be feasible and that, due to impedance mismatch, the insertion loss need not exceed a few per cent of the power over a wide range of frequencies.

Various modifications of the devices of the invention and the application thereof other than those which have been illustrated and described in this divisional application, which are within the spirit and scope of the invention, will occur to persons skilled in the art.

What is claimed is:
1. In combination in a wave transmission system, a dielectric wave guide adapted for transmission of electric waves of the dominant mode with only one polarization and two wave transmission branches connected to said wave guide at closely adjacent points in the electric and magnetic plane, respectively.

2. In combination in a wave transmission system, a dielectric wave guide adapted for transmitting waves of a given frequency and a plurality of wave transmission branches connected to said wave guide, two of said branches being connected electrically in series and in parallel, respectively, with said wave guide at oppositely situated points thereof.

3. In combination in a wave transmission system, a main dielectric wave guide of rectangular cross-section having sides with unequal transverse dimensions, adapted to transmit the dominant wave with the lines of electric intensity parallel to the shorter sides of said guide and two branching wave guides joined to said main guide at oppositely situated points thereof in such manner as to provide a series and a parallel electrical branching connection, respectively.

4. In combination in a wave transmission system, a main dielectric wave guide and two branch dielectric wave guides, each of rectangular cross-section with unequal transverse dimensions, such that each guide is adapted to transmit dominant waves with only one polarization, said two branch guides being joined to said main guide at a common point in the electric and magnetic plane, respectively, so that they are in conjugate relation with each other and in wave energy transmitting relation with said main wave guide and means to apply dominant waves to one of said guides.

5. The combination of claim 1, in which at least one of said transmission branches is a dielectric wave guide.

6. The combination of claim 1, in which at least one of said transmission branches comprises a section of coaxial line.

7. Three dielectric wave guides of elongated rectangular cross-section, extending in mutually perpendicular directions from a common junction point, two of said guides having their wider faces normal to one of said directions and the third guide having its wider faces normal to another of said directions.

8. Three dielectric wave guides of rectangular cross-section each with unequal transverse dimensions, and having their longitudinal axes extending in mutually perpendicular directions from a common junction point, the wider faces of two of said guides being perpendicular to one of said directions and the wider faces of the third guide being perpendicular to another of said directions, at least one of said two guides extending in both directions from said common junction point, and means to apply to at least one of said guides waves having lines of electric intensity perpendicular to its wider faces.

9. A duplex balancer comprising a main dielectric wave guide and two transmission branches connected respectively in series and in parallel electrically therewith at a common junction point so as to provide substantial conjugacy between said branches as regards wave energy of given frequency transmitted over either branch towards said main guide and equal distribution of said wave energy between the two portions of said main guide on either side of the branching point.

10. A duplex balancer comprising a section of dielectric wave guide connected in a closed transmission loop, adapted for the transmission of electric waves of the dominant mode with only one polarization, four transmission branches connected to said loop, at least two of said branches being connected respectively in parallel and in series electrically with said loop at a common point so as to provide at least at some frequencies electrical balance between said two branches and a given amount of electrical unbalance between each of them and each of the other two branches, and means to excite dominant waves in one of said two branches.

11. In combination, a pair of dielectric wave guides with elongated rectangular cross-sections, having their corresponding transverse dimensions in planes normal to each other and a second pair of dielectric wave guides connected to the first pair so as to form electrical series branches of one and electrical shunt branches of the other wave guide of said first pair.

12. In combination, a pair of rectangular dielectric wave guides, each with unequal transverse dimensions, adapted for the transmission of waves of a dominant mode with the lines of electric intensity normal to the larger transverse dimensions of the guide and a pair of branching dielectric wave guides both of which are connected to one guide of the first pair in the electric plane and to the second guide of said first pair in the magnetic plane of said waves.

WARREN A. TYRRELL.

REFERENCES CITED

The following references are of record in the file of this patent:

UNITED STATES PATENTS

| Number | Name | Date |
|---|---|---|
| 2,364,371 | Katzin | Dec. 5, 1944 |

FOREIGN PATENTS

| Number | Country | Date |
|---|---|---|
| 116,110 | Australia | Nov. 4, 1942 |